(12) United States Patent
Amato et al.

(10) Patent No.: US 8,301,458 B2
(45) Date of Patent: Oct. 30, 2012

(54) DYNAMIC INVENTORY DISTRIBUTION SYSTEM

(75) Inventors: Michael John Amato, Reston, VA (US);
Brent Alan Raney, Purcellville, VA (US); Joseph Anthony Narvaez, Falls Church, VA (US)

(73) Assignee: United States Postal Service, Washington, DC (US)

( * ) Notice: Subject to any disclaimer, the term of this patent is extended or adjusted under 35 U.S.C. 154(b) by 320 days.

(21) Appl. No.: 12/391,122

(22) Filed: Feb. 23, 2009

(65) Prior Publication Data

US 2009/0216371 A1 Aug. 27, 2009

Related U.S. Application Data

(60) Provisional application No. 61/031,330, filed on Feb. 25, 2008.

(51) Int. Cl.
*G06Q 10/00* (2006.01)
*H04H 60/32* (2008.01)
*G06F 19/00* (2006.01)
*B65G 47/14* (2006.01)

(52) U.S. Cl. ........... 705/1.1; 705/330; 725/20; 235/385; 221/1

(58) Field of Classification Search ................... 705/1.1, 705/330; 725/20; 235/385; 221/1
See application file for complete search history.

(56) References Cited

U.S. PATENT DOCUMENTS

| | | | |
|---|---|---|---|
| 3,043,067 A | 7/1962 | Rynkiewicz et al. | |
| 7,469,095 B1 * | 12/2008 | Lin | 386/263 |
| 2002/0195491 A1 * | 12/2002 | Bunch, III | 235/385 |
| 2003/0031386 A1 | 2/2003 | Shepard et al. | |
| 2004/0050919 A1 | 3/2004 | Calonje et al. | |
| 2005/0141787 A1 | 6/2005 | Breil | |
| 2005/0240958 A1 * | 10/2005 | Nguyen et al. | 725/20 |
| 2006/0212304 A1 | 9/2006 | Krause | |
| 2007/0083379 A1 | 4/2007 | Rosenkranz et al. | |
| 2008/0040132 A1 | 2/2008 | Foth et al. | |
| 2008/0040133 A1 | 2/2008 | Foth et al. | |
| 2010/0127013 A1 * | 5/2010 | Butler | 221/1 |

* cited by examiner

*Primary Examiner* — Fadey Jabr
(74) *Attorney, Agent, or Firm* — Knobbe Martens Olson & Bear LLP

(57) ABSTRACT

Embodiments include systems and methods of delivery DVDs, games, other electronically or computer readable media, or other high value items through the mail or via any other delivery service for return and redelivery to a second customer. For example, in one embodiment, items returned by a first customer are identified during processing of a container or mailer containing the item, the second customer is determined, a new address label is affixed to the container, and the item is delivered to the second customer.

26 Claims, 4 Drawing Sheets

DYNAMIC INVENTORY DISTRIBUTION SYSTEM

RELATED APPLICATIONS

This application claims the benefit of U.S. Provisional Application No. 61/031,330, filed on Feb. 28, 2008. This application is also related to U.S. application Ser. No. 12/391214, filed on even date. The entire disclosure of each of the above applications is hereby incorporated by reference in its entirety.

BACKGROUND

1. Field

This application relates to an envelope and systems and methods of processing the envelope for delivery DVDs, games, and other high value items through the mail or via any other delivery service for return and redelivery to a second recipient.

2. Description of the Related Technology

DVD rental services that use the mail or other delivery services typically dispatch items from a warehouse to a customer in single-use mailers. When finished, the customer returns the item in all or a portion of the mailer to the warehouse. Thus, in order to provide reasonable turn around times, providers of such rental services may incur costs of maintaining geographically distributed return centers to receive and process the mailers in a timely manner. Moreover, items being processed are not available to rent and thus larger inventories may need to be maintained. Hence, improved mailers, along with systems and methods of processing such mailers, to reduce processing latencies are desirable.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include reduced inventory costs, faster turnaround time, and lower processing costs.

One embodiment comprises a method of distributing an item to successive recipients. The method comprises receiving addressing data based on indicia on a surface of a container, and determining, based on the address data, that an item is disposed within the container. The container and the item are dispatched from a first recipient of the container and of the item. The method further comprises receiving data identifying the item disposed within the container. The data is based on further indicia on a surface of the container. The method further comprises identifying a second recipient of the item based on the data identifying the item, readdressing the container to the second recipient, and dispatching the container to the second recipient.

Another embodiment comprises a system for distributing an item to successive recipients. The system comprises a database configured to store item and recipient data and at least one processor configured to receive addressing data based on indicia on a surface of a container, and determine based on the address data that an item is disposed within the container. The container and the item have been dispatched from a first recipient of the container and of the item. The processor is further configured to receive data identifying the item disposed within the container, the data being based on further indicia on a surface of the container. The processor is further configured to identify a second recipient of the item based on the data identifying the item and based on the data stored in the database, generate instructions for readdressing the container to the second recipient and dispatching the container to the second recipient; and update the data in the database to associate the item with the second recipient.

Another embodiment comprises a system for distributing an item to successive recipients. The system comprises means for storing item and recipient data and means for processing configured to receive addressing data based on indicia on a surface of a container, and determine based on the address data that an item is disposed within the container. The container and the item have been dispatched from a first recipient of the container and of the item. The processing means is further configured to receive data identifying the item disposed within the container, the data being based on further indicia on a surface of the container. The processing means is further configured to identify a second recipient of the item based on the data identifying the item and based on the data stored in the database, generate instructions for readdressing the container to the second recipient and dispatching the container to the second recipient; and update the data in the database to associate the item with the second recipient.

Another embodiment comprises a computer-program product for distributing an item to successive recipients. The product comprises a computer-readable medium having stored thereon data indicative of codes executable by at least one processor to: receive addressing data based on indicia on a surface of a container, determine based on the address data that an item is disposed within the container, the container and the item having been dispatched from a first recipient of the container and of the item, receive data identifying the item disposed within the container, the data being based on further indicia on a surface of the container, identify a second recipient of the item based on the data identifying the item, readdress the container to the second recipient, and dispatch the container to the second recipient.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments include systems and methods of delivering DVDs, high definition video discs, audio compact discs, games stored on disc memory card or cartridge, other electronically or computer readable media, or other high value items through the mail or via any other delivery service for return and redelivery to a second customer. For example, in one embodiment, items returned by a first customer are identified during processing of a container or mailer containing the item, the second customer is determined, a new address label is affixed to the container, and the item is delivered to the second customer. Desirably, such a system and method can reduce processing time and/or inventory requirements of such rental systems.

It is to be recognized that while various embodiments are discussed herein with reference to delivery of computer readable media enclosed within envelopes, other embodiments may include systems and methods of processing and delivering of any item that may be rented or shared between users such as tools, books, or specialized articles associated with particular businesses or hobbies.

Figure 1:
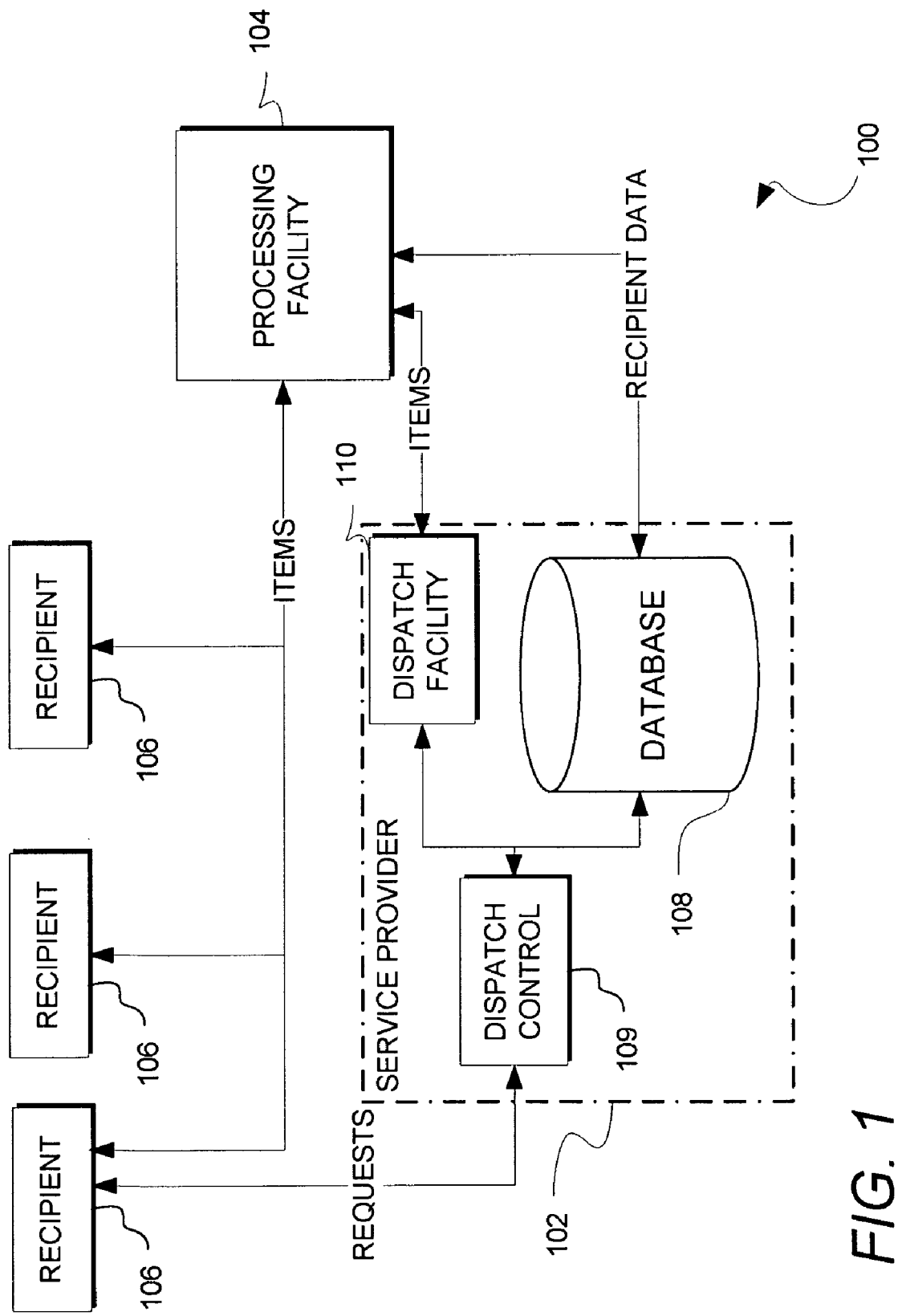
FIG. 1 is a top level block diagram illustrating one embodiment of a system including a service provider and processing facility for delivering items to multiple recipients.

FIG. 1 is a top level block diagram illustrating one embodiment of a system 100 that includes a service provider 102 and processing facility 104 for delivering items to multiple recipients 106. The service provider 102 maintains a database 108 that stores information about items requested by recipients. A dispatch control module 109 maintains request data in the database 108 and selects particular recipients to next receive particular items based on the request and item data stored in the database 108. The dispatch control module 109 may also control a dispatch facility 110 that processes requests by providing requested items in addressed containers and dispatching the containers to the address of the selected recipient 106. Each of the dispatch control module 109, the database 108, and the dispatch facility 110 may comprise one or more computer processors and associated software configured to perform the above-described functions. The dispatch facility 110 may also include container processing apparatuses operating under the direction of such processors. The various processors and databases may be configured to communicate via any suitable data network such as, for example, one or more private networks and/or the Internet.

The dispatch facility 110 of the service provider 102 provides the items in the containers to the processing facility 104 for delivery to the selected recipient 106. After use of the item, the recipient 106 returns the item to the container. In one embodiment, the recipient 106 removes an address label listing the address of the recipient 106 from the container to reveal a return processing address. The recipient 106 then dispatches the container (and the item disposed within the container) to the return address.

In one embodiment, the processing facility 104 reads an identifier associated with the item that is positioned in a viewing area of the container. The processing facility 104 recognizes that the identifier (or both) is indicative of processing according to the system 100. In one embodiment, the processing facility in addition, or alternatively, reads the return address on the container to recognize that the container is to be processed by the system 100.

The processing facility 104 communicates with the database 108 of the service provider 102 to determine the next recipient 106 of the item. The processing facility 104 readdresses the container to the second recipient and dispatches the container to the second recipient 106.

Figure 2:
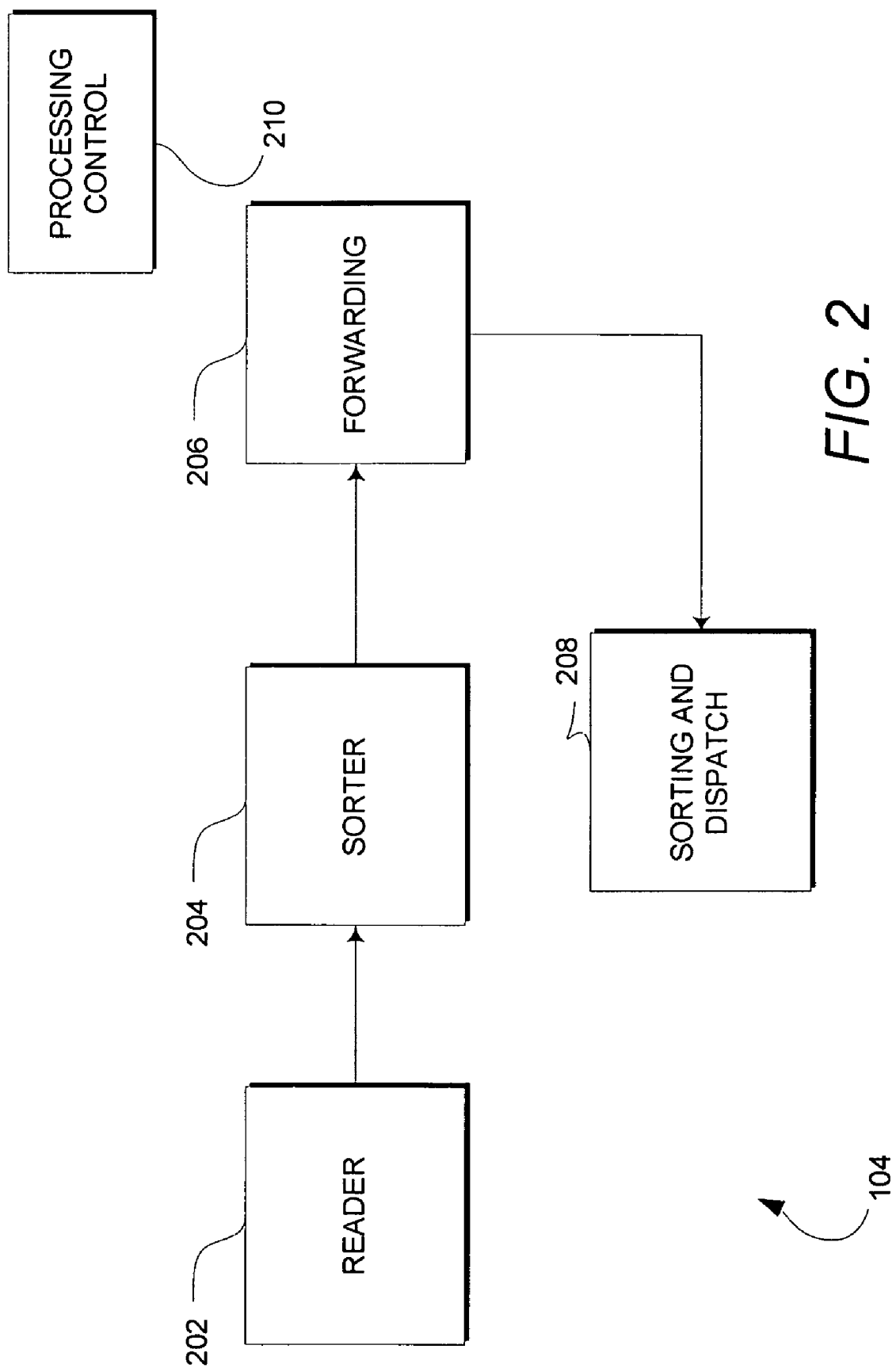
FIG. 2 is a block diagram illustrating portions of a processing facility according to one embodiment of a system such as illustrated in FIG. 1.

FIG. 2 is a block diagram illustrating portions of the processing facility 104 in further detail. In particular, the processing facility 104 includes a reader 202 configured to read address and identifier information from the container as received from the first recipient 106. A sorter 204 sorts the identified containers and provides containers having identified items disposed therein to a forwarding unit 206 that readdresses the container with delivery information for the second recipient 106. A sorting and dispatch unit 208 receives the container from the forwarding unit 206 and sorts and dispatches the readdressed container to the second recipient 106. In one embodiment, the processing facility operates under control of processing control module 210 which may be implemented as a computer processor in communication with one or more of the reader 202, the sorter 204, the forwarding unit 206 and the sorting and dispatch unit 208. In one embodiment, the reader 202, the sorter 204, the forwarding unit 206 and the sorting and dispatch unit 208 may comprise commercially available envelope or container processing equipment such as used in mail processing facilities that are adapted for use in the system 100. In one such embodiment, the control module 210 is configured to provide the functions discussed herein by providing suitable control and processing to commercially available mail forwarding systems such as provided by the United States Postal Service.

The reader 202 comprises one or more of an optical character recognition system, a bar code reader, a magnetic stripe reader, a RFID tag reader, or any other apparatus suitable for reading address and/or identifier information from an envelope or other container. In one embodiment, the reader 202 is configured to read the address of the container. When an address associated with the service provider 102 is recognized, the reader 202 further reads the identifier associated with the item disposed within the container. In another embodiment, the reader 202 reads the identifier and identifies the container and item as being associated with the service provider 102 (without necessarily reading the return address of the container). In one such embodiment, the container can be dispatched with the address of the first recipient 106 still visible as the container is processed without reference to that address.

Based on the information from the reader 202, the sorter 204 sorts and dispatches the identified container to the forwarding unit 206. The sorter 204 may comprise a commercially available envelope or container sorting unit. In one embodiment, the forwarding unit 206 (directly or via the control module 210) receives addressing information of the next selected recipient 106 of the container from the database 108 of the service provider. In one embodiment, the dispatch control module 109 selects the next recipient 106 and provides the address data from the database 108 to the forwarding unit 206.

In another embodiment, the control module 210 includes a synchronized database (not shown) that duplicates and synchronizes with the database 108. In such an embodiment, the control module 210 provides addressing information for the next recipient 106 to the forwarding unit 206 and provides updated information to the service provider 102 regarding the status of the container and item. The forwarding unit 206 addresses the container according to the provided address information. In one embodiment, the forwarding unit 206 prints the address information on a label and applies the label having the address information printed thereon to the container in a specified location. In one embodiment, the forwarding unit 206 comprises a commercial envelope or other container processing apparatus such as are used to provide mail forwarding services based on a change of address database. Such devices can be adapted to use the information of the database 108 in lieu of such a change of address database.

The sorting and dispatch unit 208 receives the readdressed container from the forwarding unit 206 and is configured to sort and dispatch the container to the second recipient 106. The sorting and dispatch unit 208 may comprise any suitable apparatus or system for sorting and dispatching envelopes or other containers to a recipient. In one embodiment, each of the reader 202, sorter 204, and forwarding unit 206 are provided by the service provider 102 while the sorting and dispatch unit is provided by a commercial container delivery service such as the United States Postal Service. In another embodiment, the commercial delivery service provides each component of the processing facility 204.

Figure 3:
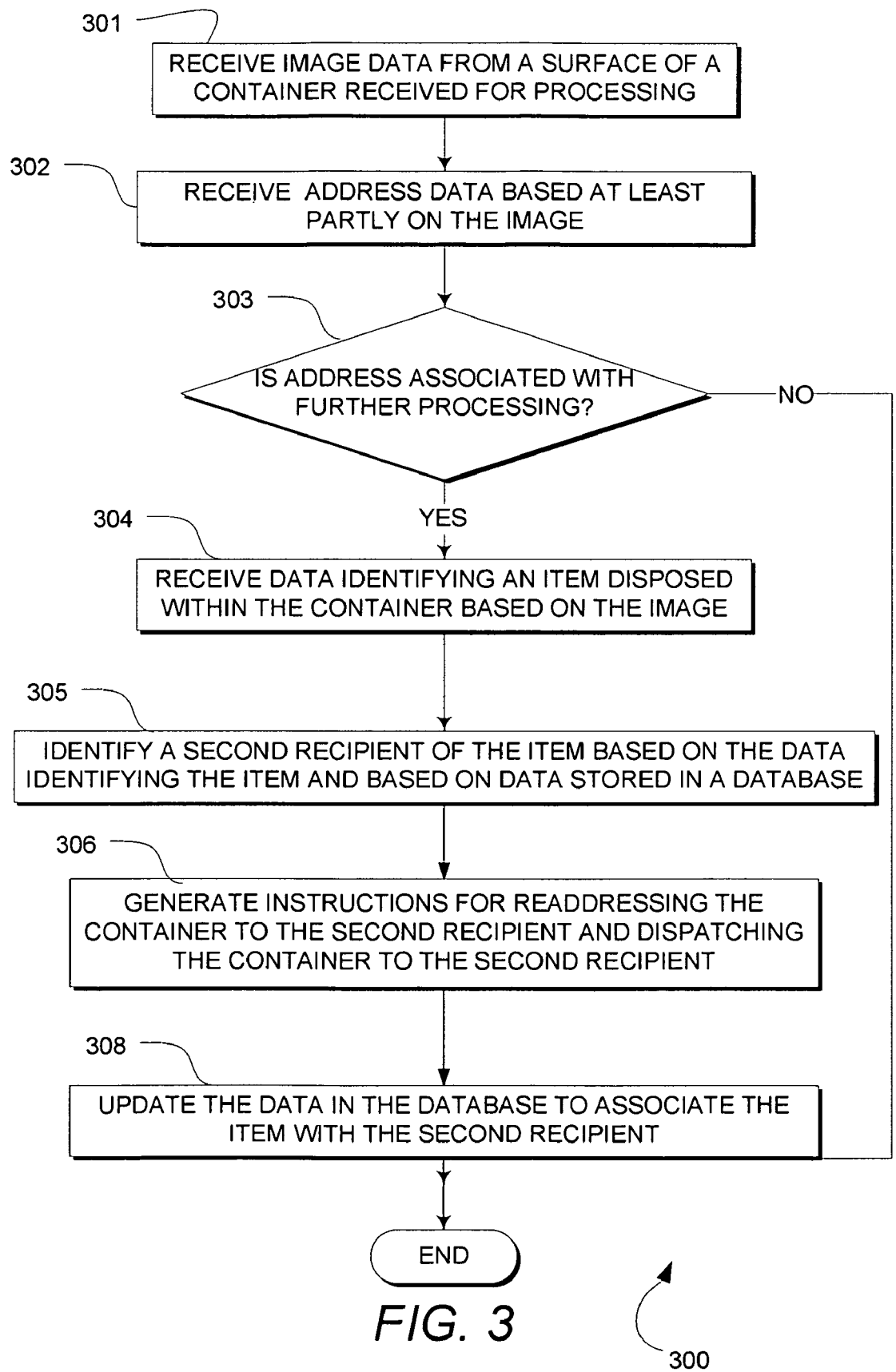
FIG. 3 is a flowchart illustrating one embodiment of a method of distributing items using a system such as illustrated in FIG. 1.

FIG. 3 is a flowchart illustrating one embodiment of a method 300 of distributing items using the system 100. The method 300 begins at a block 301 in which a processor such as one comprising the processing control module 210 of FIG. 2 receives image data from a surface of a container that has been received for processing. Moving to a block 304, based on OCR or bar code processing, an address is generated for the container and received by the processing control module 210. Next at a block 303, the processing control module 210 determines whether the address is associated with further processing to, for example, identify a subsequent recipient of the container. In one embodiment, the database 108 includes addresses associated with items to be processed by the system 100 and the determination at the block 303 is made based on a lookup of the received address in a designated index of the database 108. If the address is not associated with further processing, the container is not processed further via the method 300. If the address is associated with the system 100 for further item processing, the method 300 proceeds to a block 304.

In one embodiment, the identifying may be performed during regular mail or other delivery service processing in which a destination address is read in connection with reading the destination address of the container. For example, in one embodiment, the identification may be performed as part of mail processing such that items to be delivered as part of the system 100 are identified based on the destination or return address of the container. In one such embodiment, the containers are identified similar to other envelopes or containers having an addressed that is to be forwarded automatically.

Moving to the block 304, the processing control module 210 receives data identifying an item disposed within the container based on the image date. In particular, the item is identified as an item disposed within a container that has been dispatched from a first recipient of the container and of the item. In one embodiment, the processing control module 210 receives the identifying data from the reader 202 of FIG. 2, which reads an identifier of the item that is positioned at a selected location on the container. In one embodiment, the reader 202 processes the image data to decode the identification data in response to a signal or request from the processing control module 210 that is provided based on identifying the destination address of the container as being associated with item processing. In one embodiment, the identifier of the item is disposed on a sleeve enclosing the item and the reader 202 reads the identifier via a viewing area of the container when obtaining the image data. For example, the viewing area may comprise an opening in a surface of the container or a transparent portion of the container through which an identifier on the item or on a sleeve enclosing the item may be read. The reader 202 may capture an image of the container, provide the destination address as discussed with reference to the block 303, and subsequently provide the identifier of the item within the container based on the same image. Desirably, the method 300 can thus be performed within an address based parcel processing system using the single imaging of the parcel used to obtain the address to also obtain the identifier.

In one embodiment, the identifier is obtained in response to determining that the address of the parcel is associated with an item. In such an embodiment, processing of the image of the parcel for an item identifier can be limited to containers that labeled with an address associated with item processing.

The identifier may comprise at least one of data identifying the item and data identifying the first recipient. For example, the identifier may comprise a serial number or other unique identifier associated with the item. In addition, or alternatively, the identifier may comprise address or other data identifying the first recipient such that the processing control module 210 may identify the item based on information in the database 108 associating the item with the first recipient.

In another embodiment, the acts and events associated with the method 300 are performed on containers that have been sorted or otherwise include only those to be processed according to the method 300. For example, in one embodiment, the containers are presorted based on address or other indicia on the container. In another embodiment, the containers are delivered based on the return address to a specified processing facility to perform the method 300.

Moving to a block 305, the processing control module 210 identifies a second recipient of the item based on the data identifying the item. In one embodiment, the processing control module 210 accesses the database 108 (or a local database synchronized with the database 108) and identifies the second recipient based at least in part on request data received from the second recipient. For example, one or more potential recipients may have requested the particular item. The second recipient may be selected based on a priority of the request given to the item by each potential recipient, a time that each potential requester has waited for the item, or any other criteria or combination of criteria. In one embodiment, the processing control module 210 identifies the second recipient based at least in part on one of a transit time or a transit cost of dispatching the item to the second recipient versus other requestors of the particular item. If no potential recipients exist (e.g., no pending requests for the item are in the database 108), a specified address or the service provider or other sorting hold area may be identified as the next recipient so that the container and item may be returned the service provider 102 or dispatched to a sorting hold area until requested by another recipient.

In one embodiment, the processing control 210 also updates the database 108 to indicate that the first recipient has returned the item and that the item has been forwarded to the second recipient. In addition, the processing control 210 may also be configured to update a database of processing and/or mailing charges associated with providing the processing described herein.

Next at a block 306, the forwarding unit 206, which may be under instruction by the processing control module 210, readdresses the container to the second recipient. In one embodiment, the forwarding unit 206 readdresses the container by applying a label to the container. In one embodiment, the forwarding unit 206 or associated equipment prints addressing information indicative of the second recipient on the label. Other information such as the recipient name and an account number associated with the recipient may also be included on the label. The addressing information may comprise a street or mailing address. In one embodiment, the addressing information on the label comprise a postal delivery point code in numeric or symbolic (e.g., bar code) form. In one embodiment, the addressing label comprises an 11 digit U.S. Postal Service delivery point code or barcode.

Proceeding to a block 308, the container is dispatched to the second recipient. For example, in one embodiment, the container proceeds from the forwarding unit 206 to a sorting and dispatch unit 208 that sorts and dispatches the container to the second recipient using known container sorting and dispatch methods and systems. For example, in one embodiment, the readdressed container is sorted and dispatched via a commercial delivery service such as the United States Postal Service. In one embodiment, all or selected portions of the method 300 may be performed at a container processing facility of a commercial delivery service.

Other functions may also be performed as part of, or in connection with, the method 300. For example, at the block 304, in addition to reading the identifier, the reader 202 may be configured to perform, or provide data for performing, additional functions. In one such embodiment, the reader 202 comprises a bar code or OCR reader that operates by imaging at least one surface of the container and processing that image data to read the address and/or identifier of the container. A processor at the reader 202 or the processing control 210 receives the image data indicative of at least a portion of the item viewable via the viewing area (which may be the substantially all of one or more surfaces of the item if, for example, the container comprises a substantially transparent surface). The processor examines the image data and detects physical damage to the item based on the image data by, for example, identifying possible cracks or other damage to the item. When a possibly damaged item is detected, at the block 304, the processing control 210 identifies a specified recipient for the item when damage is detected. For example, the item may be directed back to the service provider 102 or directed to specified processing station for further inspection and specified processing if damage is found.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Figure 4B:
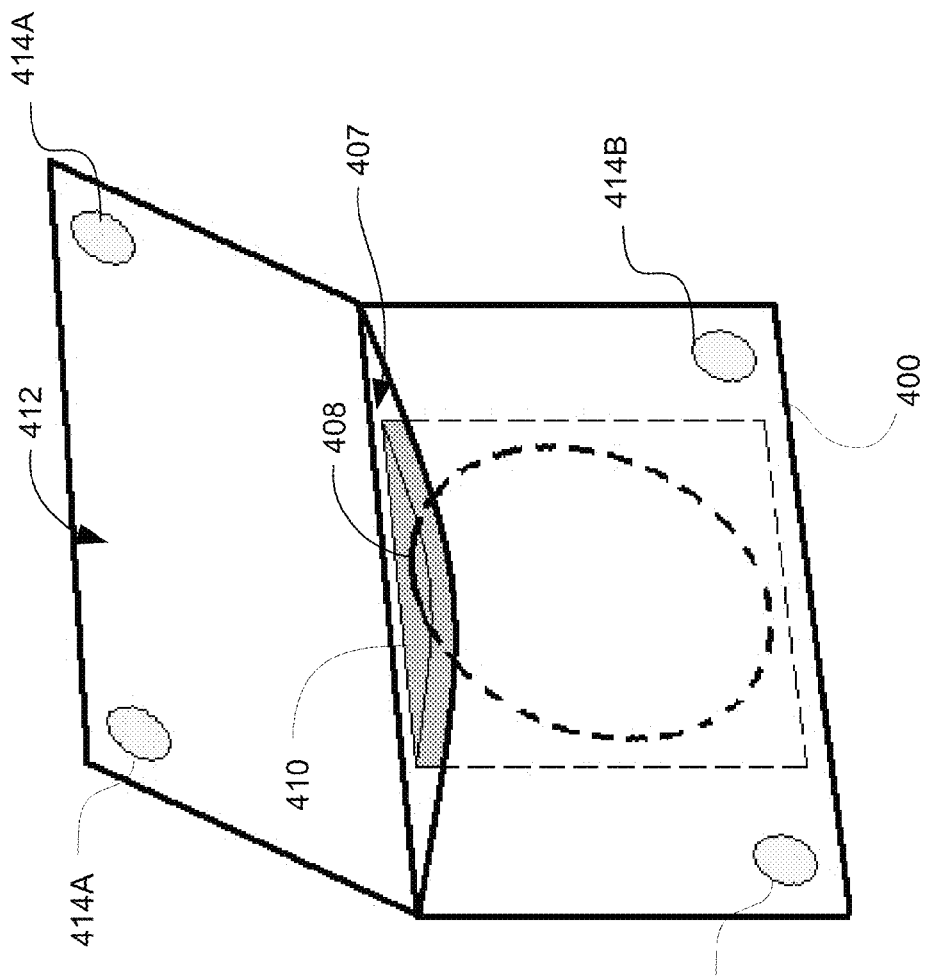
FIG. 4B is a rear perspective view of the embodiment of an envelope of FIG. 4A.
Figure 4A:
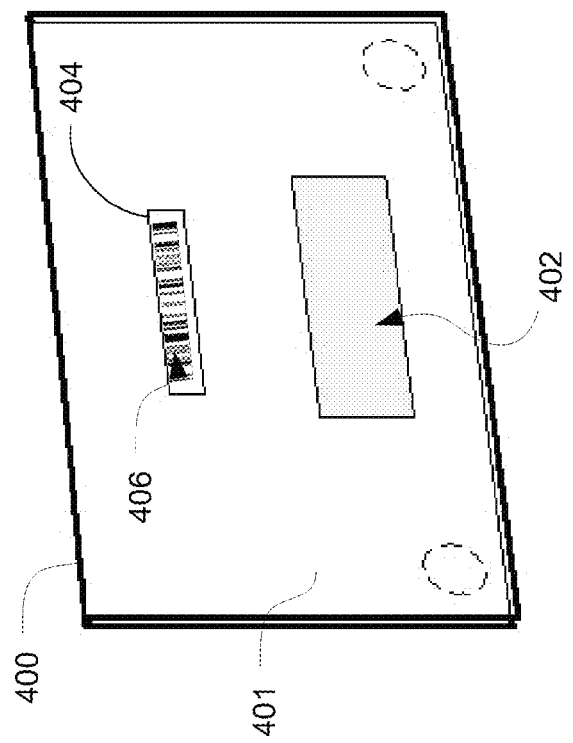
FIG. 4A is a front perspective view of one embodiment of a suitable envelope for use in connection with the system of FIG. 1.

FIG. 4A is a front perspective view of one embodiment of a suitable container, which in the illustrated embodiment comprises an envelope 400, for use in connection with the system 100. The envelope 400 is formed of one or more planar sheets of a material suitable for repeated processing cycles. For example, in one embodiment, the envelope 400 is formed of one or more sheets of suitable folded or bonded sheets of Tyvek™ or similar material. In the illustrated embodiment, the envelope 400 has an addressing portion 402 on which removable address labels may be applied. The addressing portion 402 may be positioned to accommodate reading by the reader 202 of FIG. 2. A viewing area 404 exposes an identifier 406 of the item disposed within the envelope 400. The viewing area 404 may also be positioned to accommodate reading by the reader 202.

FIG. 4B is a rear perspective view of the envelope 400 of FIG. 4A. FIG. 4B illustrates an opening 407 into an inner pocked formed within the envelope 400 into which an item 408 is placed. In the illustrated embodiment, the item 408 has been inserted within a protective sleeve 410. In one embodiment, the identifier 406 of the item 408 is on a surface of the sleeve 410 and positioned to be visible in the viewing area 404. In one embodiment, the size and the shape of the opening 407 and the sleeve 410 are selected such that the sleeve only fits into the opening 407 in a particular orientation or orientations and such that one or more copies of the identifier 406 are visible in the opening 404. In an alternate embodiment, no sleeve is used and the identifier is positioned on the item 408. In another embodiment, the identifier 404 associated with the item is on a surface of, or otherwise integral with, the envelope 400. Such embodiments may optionally include the sleeve 410.

In the illustrated embodiment of the envelope 400, the item 408 is secured in the pocket defined by the opening 407 by a flap 412. In the illustrated envelope 404, a hook and loop closure system of elements 414A and 414B is used to secure the item 408 in a resealable fashion. In other embodiments, the flap 412 may be configured to fold into the opening 407 to seal the envelope 400 or configured to fold into slits (not shown) on the rear surface of the envelope 400. In yet another embodiment, the envelope 400 may comprise a zipper type reusable closure.

The system 100 may be configured to track usage of the particular envelopes 400 or other containers so that their age and number of uses of either or both of the envelopes 400 and the items 408 can be tracked to allow proactive replacement of containers. In addition, in one embodiment the envelope 400 or other container may have its own unique identifier in place of, or in addition to, the identifier of the item 408 so as to allow such tracking over uses with different items 408. Such usage information may be maintained in the database 108 or in a separate database indexed by the identifier of one or both of the item and containers.

In view of the above, one will appreciate that the invention overcomes the problem of processing time and costs associated with delivery systems that employ single use containers. For example, embodiments provide a way of reusing containers to reduce human processing and repackaging costs, to reduce waste paper from disposable containers thereby improving "green" compliance, and decreasing latency between uses of particular items.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of distributing an item to successive recipients, the method comprising:
    receiving addressing data based on indicia on a surface of a container;
    determining with a computer, based on the address data, that an item is disposed within the container, the container and the item having been dispatched from a first recipient of the container and of the item;
    receiving data identifying the item disposed within the container, the data being based on further indicia on a surface of the container;
    receiving image data indicative of at least a portion of the item disposed within the container, wherein the item is viewable via a viewing window on the container and wherein the image data is generated by inspecting the item through the viewing window;
    detecting physical damage to the item based on the image data;
    identifying through use of a computer a second recipient of the item based on the detected physical damage to the item;
    readdressing the container to the second recipient; and
    dispatching the container to the second recipient.

2. The method of claim 1, wherein readdressing the container comprises applying a label to the container, the label having printed thereon addressing information indicative of the second recipient.

3. The method of claim 1, wherein receiving data identifying the item disposed within the container comprises reading an identifier of the item positioned at a selected location on the container.

4. The method of claim 3, wherein the identifier of the item comprises at least one of data identifying the item and data identifying the first recipient.

5. The method of claim 3, wherein the identifier of the item is disposed on a sleeve enclosing the item and wherein reading the identifier comprises reading the identifier via the viewing window of the container.

6. The method of claim 5, wherein reading the identifier via the viewing window of the container comprises reading the identifier through one of a transparent portion of the container or an opening in a surface of the container.

7. The method of claim 6, further comprising:
    obtaining image data indicative of at least a portion of the surface of the container;
    generating the address data based on the image data; and
    generating the data identifying the item based on the image data in response to the determining.

8. The method of claim 1, wherein the item comprises a computer-readable medium, and wherein the addressing information identifies content stored on the computer readable medium.

9. The method of claim 8, wherein the computer-readable medium comprises at least one of a memory card, an electronically readable disc, a game cartridge, a DVD, or a disc storing high definition video content.

10. The method of claim 8, further comprising receiving the container having the item disposed therein, the container and the item having been received from the first recipient of the container and item.

11. The method of claim 1, wherein identifying the second recipient of the item further comprises identifying the second recipient based at least in part on one of a transit time or a transit cost of dispatching the item to the second recipient.

12. The method of claim 1, wherein identifying the second recipient of the item further comprises identifying the second recipient based at least in part on request data received from the second recipient.

13. The method of claim 1, further comprising updating a database with data indicative of dispatching the item to the second recipient.

14. A system for distributing an item to successive recipients, the system comprising:
    a database configured to store item and recipient data;
    at least one processor configured to:
        receive addressing data based on indicia on a surface of a container;
        determine based on the address data that an item is disposed within the container, the container and the item having been dispatched from a first recipient of the container and of the item;
        receive data identifying the item disposed within the container, the data being based on further indicia on a surface of the container;
        receive image data indicative of at least a portion of the item disposed within the container, wherein the item is viewable via a viewing window on the container and wherein the image data is generated by inspecting the item through the viewing window;
        detect physical damage to the item based on the image data;
        identify a second recipient of the item based on the detected physical damage to the item and based on the data stored in the database;
        generate instructions for readdressing the container to the second recipient and dispatching the container to the second recipient; and
        update the data in the database to associate the item with the second recipient.

15. The system of claim 14, wherein generating instructions for readdressing the container comprises instructing at least one apparatus to generate and apply a label to the container, the label having printed thereon addressing information indicative of the second recipient.

16. The system of claim 14, further comprising a scanner configured to read the identifier of the item positioned at a selected location on the container.

17. The system of claim 16, wherein the scanner comprises at least one of a bar code reader or an optical character recognition reader.

18. The system of claim 14, wherein the identifier of the item comprises at least one of data identifying the item and data identifying the first recipient.

19. The system of claim 14, wherein the identifier of the item is disposed on a sleeve enclosing the item and wherein the reader is configured to read the identifier via the viewing window of the container.

20. The system of claim 14, wherein the identifier of the item is disposed on a sleeve enclosing the item and wherein the reader is configured to read the identifier through one of a transparent portion of the container or an opening in a surface of the container.

21. The system of claim 14, wherein the item comprises a computer-readable medium, and wherein the addressing information identifies content stored on the computer readable medium.

22. The system of claim 21, wherein the computer-readable medium comprises at least one of a memory card, an electronically readable disc, a game cartridge, a DVD, or a disc storing high definition video content.

23. The system of claim 14, wherein the processor is configured to identify the second recipient based at least in part on one of a transit time or a transit cost of dispatching the item to the second recipient.

24. The system of claim 14, wherein the processor is configured to identify the second recipient based at least in part on request data received from the second recipient.

25. A system for distributing an item to successive recipients, the system comprising:
   means for storing item and recipient data;
   means for processing data, said processing means configured to:
      receive data identifying an item disposed within a container received for processing, the container and the item having been dispatched from a first recipient of the container and of the item;
      receive image data indicative of at least a portion of the item disposed within the container, wherein the item is viewable via a viewing window on the container and wherein the image data is generated by inspecting the item through the viewing window;
      detect physical damage to the item based on the image data;
      identify a second recipient of the item based on the detected physical damage to the item and based on the data stored in the database;
      generate instructions for readdressing the container to the second recipient and dispatching the container to the second recipient; and
      update the data in the database to associate the item with the second recipient.

26. A computer-program product for distributing an item to successive recipients, the product comprising:
   a non-transitory computer-readable medium having stored thereon data indicative of codes executable by at least one processor to:
      receive addressing data based on indicia on a surface of a container;
      determine based on the address data that an item is disposed within the container, the container and the item having been dispatched from a first recipient of the container and of the item;
      receive data identifying the item disposed within the container, the data being based on further indicia on a surface of the container;
      receive image data indicative of at least a portion of the item disposed within the container, wherein the item is viewable via a viewing window on the container and wherein the image data is generated by inspecting the item through the viewing window;
      detect physical damage to the item based on the image data;
      identify a second recipient of the item based on the detected physical damage to the item;
      readdress the container to the second recipient; and
      dispatch the container to the second recipient.

* * * * *